J. L. PORTER.
BOX FOR BUGGY HUBS.
APPLICATION FILED JAN. 5, 1907.
899,900.
Patented Sept. 29, 1908.
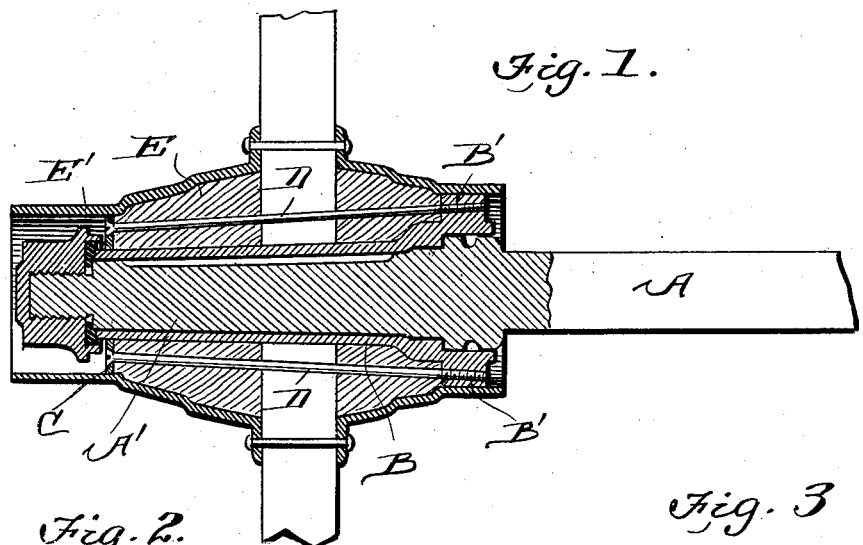
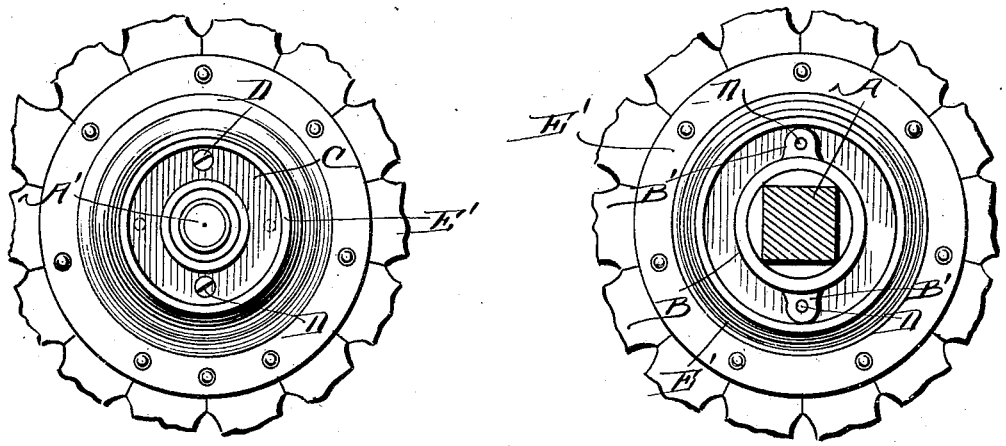
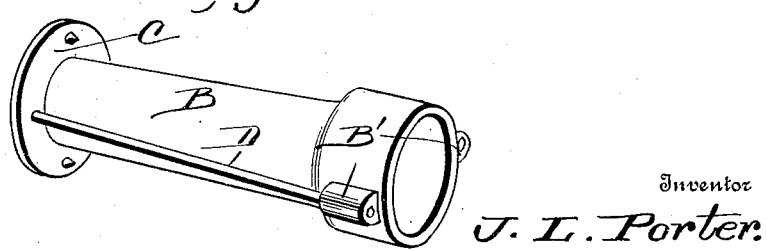
Inventor
J. L. Porter.

UNITED STATES PATENT OFFICE.

JAMES L. PORTER, OF COLUMBUS, MONTANA.

BOX FOR BUGGY-HUBS.

No. 899,900.  Specification of Letters Patent.  Patented Sept. 29, 1908.

Application filed January 5, 1907. Serial No. 350,951.

*To all whom it may concern:*

Be it known that I, JAMES L. PORTER, a citizen of the United States, residing at Columbus, in the county of Yellowstone and State of Montana, have invented a new and useful Improvement in Boxes for Buggy-Hubs, of which the following is a specification.

This invention relates to an improvement in boxes for vehicle bearings and more especially to means for securely connecting the hub and the inner sleeve or boxing which incloses the axle spindle.

The invention consists of the novel features of construction hereinafter fully described, pointed out in the claims and shown in the accompanying drawings, in which, Figure 1 is a longitudinal section through a hub and spindle showing my construction. Fig. 2 is a front end view, a lock nut and packing ring being omitted. Fig. 3 is a section through the axle showing in elevation the opposite end of the boxing and hub from that shown in Fig. 2. Fig. 4 is a perspective view of the inner sleeve with one rod in place.

In these drawings A represents an axle having a spindle A' upon which is fitted a sleeve B, and at the inner end there is cast or formed upon this sleeve two oppositely arranged outwardly extending lugs B' each of which is formed with a suitable threaded perforation extending in a direction substantially parallel to the sleeve. I also provide a collar C which is provided upon opposite sides of its center with countersunk perforations and in assembling the parts in position the collar C is slipped over the outer end portion of the sleeve B and rods D are passed through the perforations of the collar and passed through the hub E and are threaded into the openings in the lugs B'. The bearing is also provided with the usual outer boxing or sleeve E' and the hub is locked upon the spindle by the ordinary lock nut. The features which I have considered novel and which form a part of my invention are the lugs B' formed upon the inner end of the inner sleeve B, and the bolts D connecting said lugs with the collar C, the heads of the bolts being seated in the countersunk openings formed in said collar. It will be obvious that these bolts will cause the hub E to be gripped tightly between the collar C and the lugs B'.

Having thus fully described my invention, what I claim as new and desire to secure by Letters Patent, is:—

The combination with an axle spindle, of an inner sleeve outwardly extending, oppositely arranged lugs formed at the inner end of the sleeve, a hub fitting upon said sleeve, a collar fitting upon the outer end of the sleeve and bearing against the hub, the inner end of the hub bearing against the lugs and bolts passing longitudinally through the hub, through the collar and threaded into said lugs, the bolt heads resting in countersunk openings provided in the collar.

JAMES L. PORTER.

Witnesses:
  PATRICK LAVELLE,
  WILLIAM P. ADAMS.